Oct. 30, 1962 R. E. KERR ETAL 3,061,198
METHOD AND APPARATUS FOR METERING SLURRY
Filed May 31, 1960

INVENTORS
ROBERT E. KERR and
GEORGE B. SAVIERS.
BY
W. D. Palmer
ATTORNEY.

United States Patent Office 3,061,198
Patented Oct. 30, 1962

3,061,198
METHOD AND APPARATUS FOR METERING SLURRY
Robert E. Kerr, Chester, and George B. Saviers, Metuchen, N.J., assignors to Westinghouse Electric Corporation, East Pittsburgh, Pa., a corporation of Pennsylvania
Filed May 31, 1960, Ser. No. 32,761
9 Claims. (Cl. 239—4)

This invention relates to method and apparatus for metering slurry and, more particularly, to an improved method and apparatus for metering slurry at a controlled and predetermined average rate of flow.

The term "slurry" has various meanings. As used herein, a slurry is defined as a suspension of finely-divided, insoluble particles in a liquid of low viscosity. When controlling or metering the flow of such slurry so that it is delivered at a relatively slow, predetermined average rate, the flow control portion of the metering device has a tendency to become partially blocked. In explanation, when metering is effected by means of a valve which cooperates with a port, the metering orifice formed between the valve and the port will become partially blocked if finely-divided insoluble particles deposit on or in such orifice. This of course varies the amount of slurry which passes through the metering orifice. For some applications, it is very desirable to meter slurry at a slow, predetermined average rate which can be carefully controlled.

It is the general object of this invention to avoid and overcome the foregoing and other difficulties of and objections to prior-art practices by the provision of an improved method of passing slurry under a pressure head through a metering orifice at a predetermined average rate in such manner that the solids component of the slurry will not clog the metering orifice.

It is a further object to provide a metering system for delivering slurry at a controlled and predetermined average rate.

It is another object to provide an electrostatic spray coating system which incorporates a metering system for metering slurry at a controlled and predetermined average rate.

It is an additional object to provide a preferred form of metering system for controlling the flow of slurry.

The aforesaid objects of the invention, and other objects which will become apparent as the description proceeds, are achieved by varying in predetermined and rapid fashion the dimensions of the metering orifice through which the slurry passes. The average dimension of the metering orifice and the pressure head applied to the slurry are controlled with respect to one another so that the passage of the slurry through the orifice has a predetermined average rate. This is also provided a metering system, which preferably is used in combination with an electrostatic spray coating apparatus, wherein a valve is moved with respect to a port to vary in predetermined and rapid fashion the dimensions of the slurry metering orifice which is formed therebetween. The pressure head which is used to force the slurry through the orifice and the average orifice dimension are controlled with respect to one another so that the slurry passes the formed metering orifice in a pulsating manner, but at a predetermined average rate.

For a better understanding of the invention, reference should be had to the accompanying drawing wherein:

FIG. 1 is a diagrammatic view of an electrostatic spray coating system incorporating an improved slurry metering system for deliverying slurry at a predetermined average rate;

FIG. 2 is a sectional elevational view of a diaphragm-actuated metering valve, with the pneumatic actuation for the valve shown in diagrammatic form.

Although the principles of the invention are broadly applicable to any appliction where it is desired to meter slurry at a predetermined and controlled average rate, the metering system has particular utility with respect to an electrostatic spray coating system and hence it has been so illustrated and will be so described.

With respect to the specific form of the invention illustrated in the drawing, in FIG. 1 is illustrated in diagrammatic form an electrostatic spray coating system which incorporates the improved metering system of this invention. Briefly, the coating system comprises an electrostatic spray coating apparatus 10 and a metering system 12 for delivering a flow of slurry at a predetermined and controlled average rate to the spray coating apparatus 10. Considering first the metering system 12, it operates as a closed, circulating system in order to maintain the slurry in suspension. The type of slurry to be coated can be varied considerably and as a specific example, the system 12 is used to meter a slurry of electroluminescent phosphor particles which are suspended in an organic vehicle including dissolved plastic. By way of further detail, the slurry comprises phosphor and vehicle mixed in the proportions of 361 grams of phosphor, 742 milliliters of polyvinyl chloride acetate lacquer, and 2,722 milliliters of thinner. The phosphor is finely-divided zinc sulfide electroluminescent phosphor which has an average particle diameter of approximately 10 microns. The lacquer comprises 20.8% by weight of polyvinyl-chloride acetate and sufficient xylene and methyl isobutyl ketone solvent so that this lacquer has a viscosity of from 16 to 22 seconds, as measured with a No. 3 Zahn cup. The thinner is a mixture of xylene and methyl isobutyl ketone and has a viscosity of 8 seconds, as measured with a No. 3 Zahn cup.

The phosphor-vehicle slurry mixture is introduced into the system 12 through a reservoir 14 which includes a power-driven agitator 16 to stir the slurry continually to maintain an even suspension. A pump 18 is used to move the slurry from the reservoir 14 and through a supply line 20. Preferably two air-motor-driven, positive-displacement pumps are used, operating in such manner that they are phased 180° apart, in order to even out any pumping pressure variations which might be introduced. It should be understood that other types of pumps can be substituted for the preferred positive-displacement pumps. The slurry is maintained at a predetermined pressure within the supply line 20 by means of an adjustable pressure-regulating valve 22 which controls to a predetermined value the pressure head in the supply line 20, as indicated on the gage 23. The construction of such pressure-regulating valves is well known and pneumatically-operated diaphragm-type valves are preferred. A return line 24 from the pressure regulating valve 22 connects into the reservoir 14, so that the slurry which is not metered for coating is agitated to insure an even phosphor suspension at all times.

A metering device 26 connects into the supply line 20 intermediate the pump 18 and the pressure regulating valve 22 and this metering device is shown in enlarged view in FIG. 2. Briefly, the metering device 26 comprises a valve means 28 which comprises a slurry inlet and a port means 30 which comprises a metered slurry outlet. The spacing between the valve 28 and the port 30 form a slurry metering orifice 32. As a specific example, the valve 28 is a conical type and the port 30 has a tapered configuration corresponding to the taper on the valve 28. The port diameter at the inlet is 0.125 inch and the port tapers through 0.562 inch to a minimum diameter of 0.100 inch. Other valve types can be substituted for the preferred conical type. The positioning of the valve 28 with respect to the port 30 is controlled by means of a spring-loaded diaphragm 34 which is pneumatically actuated. The actuating compressed air is introduced through a conventional pressure regulating valve 36. A position indicator 38 operates from the shaft 40 which connects the actuating diaphragm 34 to the valve 28 so that the movement of the valve 28 can be carefully monitored.

In accordance with the present invention, the valve 28 is moved with respect to the port 30 so as to vary in predetermined, rapid and oscillatory fashion the dimensions of the slurry metering orifice 32 which is formed therebetween. This is accomplished by providing a solenoid-operated valve 42 in the air supply line 44 which supplies the compressed air to actuate the diaphragm 34. The operation of the solenoid portion of the valve 42 is controlled by a conventional electrical make-and-break switch 46. When actuated, the valve 42 bleeds some of the actuating compressed air to the atmosphere 20 that the operation of the valve 42 controls the positioning of the valve 28. As a specific example, the average clearance between the valve 28 and the port 30 is approximately twenty-five mils and the valve is oscillated or dithered with respect to the port so as to vary the valve-to-port clearance from twenty-four mils to twenty-six mils. The rate of dither can be varied considerably and, as an example, eighty-eight oscillations per minute have been found to be satisfactory. This dither or variation in orifice dimensions will cause the slurry to pass through the metering orifice in a pulsating manner, but at a predetermined average rate. It has been found that if the slurry passes the orifice at slow but constant rate, some of the relatively dense zinc sulfide phosphor particles tend to deposit on the surfaces of the formed orifice, thereby causing the rate of metering to vary in an uncontrolled fashion. By causing the flow of slurry through the orifice to pulsate, the accelerated flow of slurry flushes the orifice and keeps it clean. Were the rate of flow of slurry through the metering orifice to be increased and maintained constant, the total flow of slurry would be too great. If the orifice were decreased in dimensions, while maintaining the flow of slurry therethrough at a relatively fast rate, some of the finely-divided solid material would tend to clog such smaller orifice. As a further example, with the foregoing indicated specific slurry and a pressure head of 3.5 p.s.i.g. at the valve 28 which comprises the slurry inlet, slurry will be metered at an average rate of 35 ml. per minute. This has been found very suitable for coating with an electrostatic spray apparatus.

The electrostatic spray coating apparatus 10 is conventional and commercially-available equipment is utilized for the basic unit which is modified to incorporate the foregoing metering system as the slurry feed unit. Electrostatic spray coating apparatus is disclosed in U.S. Patent No. 2,770,210, dated November 13, 1956. The metered slurry is delivered through a feed conduit 48 to the spray forming and directing means of the apparatus 10. The conduit 48 delivers an average flow of slurry onto the inner surface of a power driven, rotating, spray-forming and spray-directing bell 50. Such a spray-forming bell 50 is generally disclosed in U.S. Patent No. 2,698,814, dated January 4, 1955. The resulting atomized slurry is directed through a unidirectional high-voltage electrostatic field which is formed intermediate the bell 50 and the object 52 to be coated, such as a piece of glass which carries thereon a light-transmitting, electrically-conducting layer of tin oxide. The electrically-conducting tin oxide portion of the object 52 is maintained at ground potential and a unidirectional potential, such as 95,000 volts, is applied to an electrode 54 which is positioned proximate the bell 52. When the atomized slurry is passed through the formed electrostatic field, it takes a charge and is directed to the object 52 to deposit thereon in a very uniform manner. Other forms of electrostatic spray coating apparatus can be used in conjunction with the metering system 12 as described hereinbefore.

The operation of the foregoing metering system 12 may be modified considerably. As an example, it is preferred to actuate the valve 28 with respect to the port 30 but if desired, the port could be actuated or moved with respect to a stationary valve. In addition, the pressure head which is used to control the flow of slurry through the metering orifice is preferably maintained constant by means of the pressure regulating valve 22 positioned in the supply line 20 after the metering device 26. If desired, however, the pressure head could be varied and the average dimension of the varying formed metering orifice 32 maintained constant in order to control the average but pulsating flow of slurry. Alternatively, both the pressure head and the average dimension of the varying metering orifice could be varied and controlled with respect to one another. In all cases, the average dimension of the varying metering orifice and the pressure head of the slurry at the inlet comprising the valve 28 are controlled with respect to one another so that the pulsating passage of the slurry through the formed orifice 32 has a predetermined average rate of flow. As a further alternative construction, the diaphragm-control for the valve 28 could be replaced by an electrical or mechanical control.

The foregoing method and apparatus for metering slurry have particular utility for use with an electrostatic spray coating apparatus to form a phosphor-dielectric layer. Such phosphor-dielectric layers are useful in X-ray devices such as described in U.S. Patent No. 2,863,061, dated December 2, 1958, and also in electroluminescent devices such as described in U.S. Patent No. 2,791,723, dated May 7, 1957. In forming phosphor-dielectric layers for such devices, the tin-oxide-coated glass can be passed through the spray a number of times in order to obtain a uniform coating of the desired thickness. With the specific operation of the apparatus as described hereinbefore, in order to obtain a uniformly-thick, phosphor-dielectric coating having a total thickness of two mils, the object 52 can be passed through the apparatus at a rate of six feet per minute. Under these conditions of operation, ten individual passes will provide a coating of the desired two-mil thickness. It should be understood, however, that the present method and apparatus can be used for any application where it is desired to meter slurry at a predetermined and controlled rate and the operating conditions can be varied considerably.

It will be recognized that the objects of the invention have been achieved by providing an improved method and apparatus for metering slurry, preferably to an electrostatic spray coating apparatus, and there has also been provided a specific preferred construction for a slurry metering system.

While a best embodiment of the invention has been illustrated and described in detail, it is to be particularly understood that the invention is not limited thereto or thereby.

We claim:

1. In combination with an electrostatic spray coating apparatus having a spray forming and directing means acting to form a spray of metered material and to direct such formed spray through a unidirectional high-voltage electrostatic field, the improvement which comprises: a metering system for metering slurry at a controlled and predetermined rate and comprising, port means comprising a metered slurry outlet, valve means comprising a slurry inlet and positioned with respect to said port means to form a slurry metering orifice therebetween, automatic actuating means for moving said valve means with respect to said port means in predetermined rapid and oscillatory fashion to vary in predetermined and rapid fashion the dimensions of the slurry metering orifice formed therebetween, pressure-generating means for delivering slurry under a pressure head at the slurry inlet comprising said valve means, and control means for controlling said actuating means and said pressure-generating means with respect to one another so that the average dimension of the slurry metering orifice formed between said valve means and said port means and the average slurry pressure head at the slurry inlet comprising said valve means permit slurry to pass such formed slurry metering orifice in a pulsating manner but at a predetermined average rate; and means for delivering the metered slurry to the spray forming and directing means of said apparatus.

2. The method of passing slurry by means of a pressure head completely through a metering orifice at a predetermined average rate in such manner that the solids component of the slurry will not clog the metering orifice, which method comprises, varying in predetermined and rapid fashion the dimensions of the metering orifice so as to cause the slurry to pass therethrough in a pulsating manner, and controlilng the dimensional variations and the average dimension of the varying metering orifice and the pressure head applied to the slurry with respect to one another so that the pulsating passage of the slurry through the metering orifice has a predetermined average rate of flow.

3. A metering system for delivering slurry at a controlled and predetermined rate, said system comprising: a closed slurry circulating system including, a slurry reservoir having an agitator means to maintain slurry in suspension, pump means connecting to said slurry reservoir for pumping slurry therefrom, a slurry supply line connecting to said pump means, pressure regulating means connecting to said slurry supply line for maintaining slurry therein at a predetermined pressure head, and a slurry return line connecting said pressure regulating means to said slurry reservoir; port means comprising a metered slurry outlet; valve means comprising a slurry inlet and positioned with respect to said port means to form a slurry metering orifice therebetween; the slurry inlet comprising said valve means connecting to said slurry supply line intermediate said pump means and said pressure regulating means; automatic actuating means for moving said valve means with respect to said port means in predetermined rapid and oscillatory fashion to vary in predetermined and rapid fashion the dimensions of the slurry metering orifice formed therebetween; and control means for controlling said actuating means to move said valve means with respect to said port means so that the average dimension of the metering orifice formed therebetween is controlled with respect to the pressure head on the slurry delivered at the slurry inlet comprising said valve means to permit slurry to pass such formed metering orifice at a predetermined average rate.

4. A metering device as specified in claim 3, wherein a spring-loaded diaphragm actuated by means of air under pressure serves to actuate said valve means, and solenoid-operated additional valve means acts to vary in a rapid fashion the pressure of the air which actuates said spring-loaded diaphragm.

5. A metering system for delivering slurry at a controlled and predetermined average rate of flow, said system comprising, in combination:
   (a) port means comprising a metered slurry outlet;
   (b) valve means comprising a slurry inlet and positioned with respect to said port means to form therebetween a slurry metering orifice;
   (c) automatic actuating means for moving said valve means and said port means with respect to one another to vary in predetermined, rapid and oscillatory fashion the dimensions of said slurry metering orifice;
   (d) pressure-generating means for delivering slurry under a predetermined pressure head to said slurry inlet; and
   (e) control means for controlling said actuating means and said pressure-generating means with respect to one another to control the predetermined dimensional variations of said slurry metering orifice and the predetermined slurry pressure head at said slurry inlet to pass slurry completely through said slurry metering orifice in a pulsating manner and at a predetermined average rate of flow.

6. The metering system as specified in claim 5, wherein said port means is fixed and said automatic actuating means moves said valve means with respect to said fixed port means.

7. The metering system as specified in claim 6, wherein a slurry supply line carries a continuous flow of slurry under a predetermined pressure head as maintained by said pressure-generating means, and said slurry inlet connects directly into said slurry supply line.

8. The metering system as specified in claim 7, wherein said pressure-generating means comprises a separate pump means and a pressure regulating means acting to move slurry under a predetermined pressure head through said slurry supply line, and said slurry inlet connects directly into said slurry supply line intermediate said pump means and said pressure-regulating means.

9. The metering system as specified in claim 6, wherein said actuating means moves said valve means with respect to said port means at a rate of approximately eighty-eight oscillations per minute, and both said port means and said valve means are conical in configuration.

References Cited in the file of this patent

UNITED STATES PATENTS

| | | |
|---|---|---|
| 2,481,620 | Rosenthal | Sept. 13, 1949 |
| 2,517,049 | Stevens | Aug. 1, 1950 |
| 2,766,064 | Schweitzer | Oct. 9, 1956 |